(12) United States Patent
Minamibori et al.

(10) Patent No.: US 9,498,935 B2
(45) Date of Patent: Nov. 22, 2016

(54) MOLDING PACKAGING MATERIAL AND MOLDED CASE

(71) Applicant: Showa Denko Packaging Co., Ltd., Isehara-shi, Kanagawa (JP)

(72) Inventors: Yuuji Minamibori, Isehara (JP); Tetsunobu Kuramoto, Isehara (JP)

(73) Assignee: SHOWA DENKO PACKAGING CO., Kanagawa (JP)

( * ) Notice: Subject to any disclaimer, the term of this patent is extended or adjusted under 35 U.S.C. 154(b) by 261 days.

(21) Appl. No.: 14/196,593

(22) Filed: Mar. 4, 2014

(65) Prior Publication Data

US 2014/0255764 A1  Sep. 11, 2014

(30) Foreign Application Priority Data

Mar. 5, 2013 (JP) ................. 2013-042686

(51) Int. Cl.
| | |
|---|---|
| *H01M 10/02* | (2006.01) |
| *B32B 15/088* | (2006.01) |
| *B32B 7/12* | (2006.01) |
| *H01M 2/02* | (2006.01) |
| *B32B 15/085* | (2006.01) |

(52) U.S. Cl.
CPC .............. *B32B 15/088* (2013.01); *B32B 7/12* (2013.01); *B32B 15/085* (2013.01); *H01M 2/026* (2013.01); *H01M 2/0257* (2013.01); *H01M 2/0262* (2013.01); *H01M 2/0277* (2013.01); *H01M 2/0285* (2013.01); *H01M 2/0287* (2013.01); *B32B 2250/03* (2013.01); *B32B 2323/10* (2013.01); *Y10T 428/1359* (2015.01); *Y10T 428/24942* (2015.01); *Y10T 428/31562* (2015.04); *Y10T 428/31678* (2015.04); *Y10T 428/31681* (2015.04)

(58) Field of Classification Search
CPC .................................................... H01M 10/02
See application file for complete search history.

(56) References Cited

U.S. PATENT DOCUMENTS

| | | | | |
|---|---|---|---|---|
| 2002/0160212 A1* | 10/2002 | Yamashita | ................ | B32B 7/12 428/458 |
| 2009/0269647 A1* | 10/2009 | Imoda | ............... | H01M 8/04208 429/443 |
| 2011/0014520 A1* | 1/2011 | Ueda | ..................... | H01M 2/204 429/210 |

FOREIGN PATENT DOCUMENTS

| | | | |
|---|---|---|---|
| JP | 2001-006631 A | | 1/2001 |
| JP | 2002-216714 A | | 8/2002 |
| JP | 2005-093315 | * | 4/2005 |

* cited by examiner

*Primary Examiner* — Jacob Marks
(74) *Attorney, Agent, or Firm* — Keating and Bennett, LLP

(57) ABSTRACT

A molding packaging material 1 of this invention contains a biaxially stretched polyamide film layer 2 as an outer layer, a thermoplastic resin layer 3 as an inner layer, and a metal foil layer 4 disposed between the both layers 2 and 3, in which a biaxially stretched polyamide film in which when the fracture strength of the film is defined as "X" and the fracture strain of the film is defined as "Y", the X/Y value is 230 MPa to 360 MPa is used as the biaxially stretched polyamide film 2. The molding packaging material can secure excellent moldability even when the molding packaging material is not coated with a slipperiness imparting component.

13 Claims, 1 Drawing Sheet

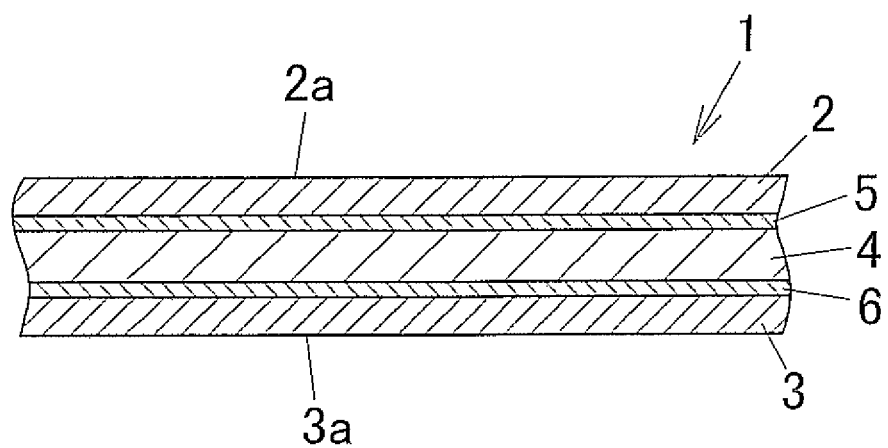

US 9,498,935 B2

MOLDING PACKAGING MATERIAL AND MOLDED CASE

TECHNICAL FIELD

The present invention relates to a molding packaging material and a molded case suitably used as cases of secondary batteries (lithium ion secondary batteries) for notebook personal computers and cellular phones, in-car secondary batteries, and stationary secondary batteries, for example, and suitably used as packaging materials of foods and packaging materials of pharmaceuticals.

In this specification, the term "Fracture strength" means the fracture strength (unit: MPa) obtained by measurement under the conditions of a sample width of 15 mm, a gage length of 100 mm, a tensile speed of 100 mm/min based on the tensile test of JIS K7127-1999.

In this specification, the term "Fracture strain" means the fracture strain (unit: none) obtained by measurement under the conditions of a sample width of 15 mm, a gage length of 100 mm, a tensile speed of 100 mm/min based on the tensile test of JIS K7127-1999.

In this specification, the term "Coefficient of static friction" means the coefficient of static friction obtained by measurement based on JIS K7125-1999, "Coefficient of static friction between the outer surfaces of a biaxially stretched polyamide film layer" means one obtained by measurement of cutting a molding packaging material into two sheets, and then bringing these two sheets into contact with each other with the outer surfaces of the biaxially stretched polyamide film layer, and "Coefficient of static friction between the outer surfaces of thermoplastic resin layer" means one obtained by measurement of cutting a molding packaging material into two sheets, and then bringing these two sheets into contact with each other with the outer surfaces of the thermoplastic resin layer.

In this specification, the term "Coefficient of dynamic friction" means the coefficient of dynamic friction obtained by measurement based on JIS K7125-1999, "Coefficient of dynamic friction between the outer surfaces of a biaxially stretched polyamide film layer" means one obtained by measurement of cutting a molding packaging material into two sheets, and then bringing these two sheets into contact with each other with the outer surfaces of the biaxially stretched polyamide film layer, and "Coefficient of dynamic friction between the outer surfaces of thermoplastic resin layer" means one obtained by measurement of cutting a molding packaging material into two sheets, and then bringing these two sheets into contact with each other with the outer surfaces of the thermoplastic resin layer.

In this specification, the word "Aluminum" is used including aluminum and an alloy thereof. The word "Metal" is used including a metal simple substance and an alloy.

TECHNICAL BACKGROUND

The lithium ion secondary battery has been widely used as the power supply of notebook personal computers, video cameras, cellular phones, electric vehicles, and the like, for example. As the lithium ion secondary battery, one which is configured so that the periphery of a battery body is surrounded by a case is used. As a packaging material for case, one is known which has a configuration in which an outer layer containing a stretched polyamide film and an inner layer containing an aluminum foil layer and a thermoplastic resin are bonded and integrated in this order (Patent Document 1).

Such a packaging material for battery case has been molded into arbitrary shapes, and therefore has been demanded to have high deep drawing moldability and high projection moldability. Therefore, one having a configuration in which the surface of an outer layer film of a packaging material is coated with a fatty acid amide-based slipperiness imparting component so that slipping of the material into a die in molding is improved (Patent Document 2) and one having a configuration in which the thickness of an outer layer film is larger than the thickness of a metal foil layer have been adopted heretofore, for example.

Patent Document 1: Japanese Unexamined Patent Application Publication No. 2001-6631
Patent Document 2: Japanese Unexamined Patent Application Publication No. 2002-216714

Problems to be Solved by the Invention

However, the configuration in which the surface of the outer layer film is coated with the fatty acid amide-based slipperiness imparting component has had a problem in that it has been required to provide a process of coating the slipperiness imparting component, which has reduced the productivity.

The configuration in which the thickness of the outer layer film is larger than the thickness of the metal foil layer has had a problem in that the total packaging material thickness has increased, and therefore, when the packaging material is used for the storage in a limited space, the volume capacity ratio of the content (packaging target) has decreased.

The present invention has been made in view of the above-described technical background. It is an object of the present invention to provide a molding packaging material and a molded case capable of securing excellent moldability even when they are not coated with a slipperiness imparting component.

Means to Solve the Problems

In order to achieve the above-described object, the present inventors have extensively conducted research. As a result, the present inventors have obtained a novel finding that the fracture strength/fracture strain (value obtained dividing the fracture strength determined by a tensile test by the fracture strain determined by the tensile test) obtained in the tensile test of a biaxially stretched polyamide film to be used as an outer layer of a molding packaging material affects the moldability and the like of the molding packaging material, and then accomplished the present invention. More specifically, the present invention provides the following measures.

[1] A molding packaging material contains a biaxially stretched polyamide film layer as an outer layer, a thermoplastic resin layer as an inner layer, and a metal foil layer disposed between the both layers, in which, as the biaxially stretched polyamide film, a biaxially stretched polyamide film in which when the fracture strength of the film is defined as "X" and the fracture strain of the film is defined as "Y", the X/Y value is 230 MPa to 360 MPa is used.

[2] The molding packaging material according to the item 1 above, in which when the coefficient of static friction between the outer surfaces of the biaxially stretched polyamide film layer is defined as "A" and the coefficient of dynamic friction between the outer surfaces of the biaxially stretched polyamide film layer is defined as "B", the A/B value is in the range of 1.0 to 2.0 and when the coefficient of static friction between the outer surfaces of the thermoplastic resin layer is defined as "C" and the coefficient of dynamic friction between the outer surfaces of the thermoplastic resin layer is defined as "D", the C/D value is in the range of 1.0 to 2.0.

[3] The molding packaging material according to the item 1 or 2 above, in which the fracture strain of the biaxially stretched polyamide film is 0.5 or more.

[4] A molded case, which is obtained by subjecting the molding packaging material according to any one of the items 1 to 3 above to deep draw forming or bulging.

[5] The molded case according to the item 4 above, which is used as a battery case.

Effect of the Invention

According to the invention of [1], since the biaxially stretched polyamide film in which when the fracture strength of the film is defined as "X" and the fracture strain of the film is defined as "Y", the X/Y value is 230 MPa to 360 MPa is used as a resin stretched film constituting the outer layer, the stress concentration caused by local stretch occurring in molding processing by a cold (normal temperature) molding method, such as deep draw forming and bulging, can be suppressed and the film can be almost uniformly transformed. Therefore, the generation of pinholes and cracks in the cold molding can be prevented. Thus, the deep drawing moldability or the moldability of bulging and the like is excellent, and molding of a shape which is sharp and has high molding height can be achieved without causing the generation of pinholes and cracks in molding. Since excellent moldability can be secured even when the molding material is not coated with the slipperiness imparting component as described above, it is not necessary to provide a process of coating the molding material with the slipperiness imparting component as in a former technique, so that the productivity is excellent. Moreover, since it is not necessary to particularly increase the thickness of the outer layer film to be larger than the thickness of the metal foil layer as in a former technique, a sufficient volume capacity ratio can be obtained when used as a packaging material for battery, for example.

According to the invention of [2], since the A/B value is in the range of 1.0 to 2.0 and the C/D value is in the range of 1.0 to 2.0, the slipperiness of the packaging material in molding the molding packaging material improves, and, as combined with the effect obtained by adopting the above-described configuration (configuration in which the X/Y value is 230 MPa to 360 MPa), the generation of pinholes and cracks in molding can be more sufficiently prevented, so that the moldability can be further improved.

According to the invention of [3], since the fracture strain of the biaxially stretched polyamide film constituting the outer layer is 0.5 or more, the biaxially stretched polyamide film is favorably stretched following to the stretch of the metal foil layer in molding, excellent moldability which does not allow the generation of pinholes also in the corner portions and the like of a molded article can be secured.

According to the invention of [4] and [5], a molded case (case for battery and the like) of a shape which is free from pinholes due to molding, is sharp, and has high molding height can be provided.

BRIEF DESCRIPTION OF THE DRAWINGS

FIG. 1 is a cross sectional view illustrating one embodiment of a molding packaging material of the present invention.

DESCRIPTION OF EMBODIMENTS

One embodiment of a molding packaging material 1 according to the present invention is illustrated in FIG. 1. The molding packaging material 1 is used as a packaging material for lithium ion secondary battery case. More specifically, the molding packaging material 1 is subjected to molding, such as deep draw forming, to be used as a secondary battery case.

The molding packaging material 1 has a configuration in which a biaxially stretched polyamide film layer (outer layer) 2 is laminated on and integrated with the upper surface of a metal foil layer 4 through a first adhesive layer 5 and a thermoplastic resin layer (inner layer) 3 is laminated on and integrated with the undersurface of the metal foil layer 4 through a second adhesive layer 6.

The biaxially stretched polyamide film layer (outer layer) 2 is a member which mainly has a role of securing good moldability as a packaging material, i.e., has a role of prevents fracture due to necking of the metal foil in molding.

In the present invention, as the biaxially stretched polyamide film layer 2, a biaxially stretched polyamide film in which when the fracture strength of the film is defined as "X" and the fracture strain of the film is defined as "Y", the X/Y value is 230 MPa to 360 MPa is used. When the X/Y value is less than 230 MPa, fracture and the generation of pinholes occur in the packaging material in molding, such as deep draw forming and bulging. On the other hand, when the X/Y value exceeds 360 MPa, separation occurs between the biaxially stretched polyamide film layer 2 and the metal foil layer 4 after molding. In particular, it is preferable to use a biaxially stretched polyamide film in which when the fracture strength of the film is defined as "X" and the fracture strain of the film is defined as "Y", the X/Y value is 250 MPa to 300 MPa as the biaxially stretched polyamide film.

The fracture strain of the biaxially stretched polyamide film 2 is preferably 0.5 or more. By the use of the biaxially stretched polyamide film having a fracture strain of 0.5 or more, the biaxially stretched polyamide film 2 is favorably stretched following to the stretch of the metal foil layer 4 in molding, and therefore excellent moldability which does not allow the generation of pinholes also in the corner portions and the like of a molded article can be secured. In particular, the fracture strain of the biaxially stretched polyamide film 2 is particularly preferably 0.7 or more.

The X/Y value of the biaxially stretched polyamide film can be controlled by adjusting the heat setting temperature in stretching processing, for example. Moreover, the X/Y value can also be controlled by changing the orientation of the crystals of the resin by selecting a stretching method (a simultaneous biaxial stretching method of simultaneously stretching the vertical direction and the horizontal direction, a successive biaxial stretching method of successively stretching the vertical direction and the horizontal direction, and the like).

When the coefficient of static friction between the outer surfaces (non-lamination surface) 2a of the biaxially stretched polyamide film layer 2 is defined as "A" and the coefficient of dynamic friction between the outer surfaces (non-lamination surface) 2a of the biaxially stretched polyamide film layer 2 is defined as "B", the A/B value is preferably in the range of 1.0 to 2.0. By the use of the biaxially stretched polyamide film layer 2 in which the A/B value is in the range of 1.0 to 2.0, the generation of pinholes and the generation of cracks in molding can be sufficiently prevented. In particular, the A/B value is more preferably in the range of 1.0 to 1.5 and still more preferably in the range of 1.0 to 1.2.

The adjustment of the coefficient of static friction and the coefficient of dynamic friction in the biaxially stretched polyamide film layer 2 can be performed by compounding an antiblocking agent (for example, silica particles, acryl resin beads, and the like) and the like in the polyamide film layer while adjusting the content.

In the present invention, the biaxially stretched polyamide film is not particularly limited and, for example, a 6-nylon film, a 6,6-nylon film, a MD nylon film, and the like can be used, for example.

The thickness of the biaxially stretched polyamide film layer 2 is preferably set to 12 μm to 50 μm.

Various additives, fatty acid amide, and the like may be added to the biaxially stretched polyamide film layer 2 insofar as the effects of the present invention are not impaired.

The thermoplastic resin layer (inner layer) 3 has a role of imparting excellent chemical resistance also against an electrolytic solution having strong corrosiveness and the like to be used in a secondary lithium ion battery and also imparting heat-sealing properties to the packaging material.

The thermoplastic resin layer 3 is not particularly limited and is preferably a non-stretched thermoplastic resin film layer. The non-stretched thermoplastic resin film layer 3 is not particularly limited and is preferably constituted by a non-stretched film containing at least one thermoplastic resin selected from the group consisting of polyethylene, polypropylene, olefin copolymers, and acid modified substances and ionomers thereof.

When the coefficient of static friction between the outer surfaces (non-lamination surface) 3a of the thermoplastic resin layer 3 is defined as "C" and the coefficient of dynamic friction between the outer surfaces (non-lamination surface) 3a of the thermoplastic resin layer 3 is defined as "D", the C/D value is preferably in the range of 1.0 to 2.0. By the use of the thermoplastic resin layer 3 in which the C/D value is in the range of 1.0 to 2.0, the generation of pinholes and the generation of cracks in molding can be sufficiently prevented. In particular, the C/D value is more preferably in the range of 1.0-1.5 and still more preferably in the range of 1.0 to 1.2.

The adjustment of the coefficient of static friction and the coefficient of dynamic friction in the thermoplastic resin layer 3 can be performed by compounding an antiblocking agent (for example, silica particles, acryl resin beads, and the like) and the like in the thermoplastic resin layer while adjusting the content.

The thickness of the thermoplastic resin layer 3 is preferably set to 20 μm to 80 μm. By setting the thickness to 20 μm or more, the generation of pinholes can be sufficiently prevented. By setting the thickness to 80 μm or less, the resin consumption amount can be reduced, so that the cost reduction can be achieved. In particular, the thickness of the thermoplastic resin layer 3 is particularly preferably set to 30 μm to 50 μm.

Various additives, fatty acid amide, and the like may be added to the thermoplastic resin layer 3 insofar as the effects of the present invention are not impaired.

Both the biaxially stretched polyimide film layer 2 and the thermoplastic resin layer 3 may be a single layer or a multiple layer.

The metal foil layer 4 has a role of imparting gas barrier properties of preventing the entering of oxygen or moisture into the packaging material. The metal foil layer 4 is not particularly limited and is preferably an aluminum foil layer. As the aluminum foil 4, a foil having a thickness of 5 μm to 50 μm containing pure Al or an Al—Fe alloy is preferably used.

The outer layer and the inner layer of the molding packaging material are layers containing resin. There is a possibility that light, oxygen, and liquid may enter the layers from the outside of the case although the amount is very slight amount and there is a possibility that the contents (the electrolytic solution of a battery, foods, pharmaceuticals, and the like) may enter the layers from the inside. When the entering substances reach the metal foil layer, the entering substances cause corrosion of the metal foil layer. In the present invention, it is preferable to adopt a configuration in which a chemical conversion coating having high corrosion resistance is formed on both surfaces of the metal foil. In this case, the corrosion resistance of the metal foil layer 4 can be improved.

The chemical conversion coating is a coating which is formed by subjecting the surface of the metal foil to chemical conversion treatment, and can be formed by subjecting the metal foil to chromating treatment or non-chromium type chemical conversion treatment using a zirconium compound, for example. For example, in the case of the chromating treatment, any one of the following aqueous solutions 1) to 3) is applied to the surface of the metal foil subjected to degreasing treatment, and then dried:

1) Aqueous solution containing a mixture of phosphoric acid, chromic acid and metal salt of fluoride, 2) Aqueous solution containing a mixture of phosphoric acid, chromic acid, metal salt and non-metal salt of fluoride, and 3) Aqueous solution containing a mixture of acrylic resin or/and phenol resin, phosphoric acid, chromic acid, and metal salt of fluoride.

For the chemical conversion coating, the chromium adhesion amount (per one surface) is preferably 0.1 mg/m$^2$ to 50 mg/m$^2$ and particularly preferably 2 mg/m$^2$ to 20 mg/m$^2$. The chemical conversion coating with such a chromium adhesion amount allows the formation of a molding packaging material with high corrosion resistance.

A configuration in which the chemical conversion coating is formed only on one surface of the metal foil may be adopted.

The first adhesive layer 5 is not particularly limited, and includes, for example, an adhesive layer formed with acid modified polyolefin such as maleic anhydride modified polyethylene and maleic anhydride modified polypropylene, urethane resin, acrylic resin, a resin containing a thermoplastic elastomer, and the like.

The second adhesive layer 6 is not particularly limited and includes, for example, an adhesive layer formed with acid modified polyolefin such as maleic anhydride modified polyethylene and maleic anhydride modified polypropylene, urethane resin, acrylic resin, a resin containing a thermoplastic elastomer, and the like.

In the embodiment described above, the configuration in which the first adhesive layer 5 and the second adhesive layer 6 are provided is adopted but both the layers 5 and 6 are not indispensable constituent layers and a configuration of not providing these layers can also be adopted.

In the present invention, a configuration in which a polyester film layer (particularly, a polyethylene terephthalate film layer is preferable) is further laminated on the outer surface 2a of the biaxially stretched polyamide film layer 2 may be adopted. More specifically, in the configuration illustrated in FIG. 1, a configuration in which a polyester film layer is further laminated on the upper surface of the biaxially stretched polyamide film layer 2 may be adopted.

A molded case (battery case and the like) can be obtained by molding (deep draw forming, bulging, and the like) the molding packaging material 1 of the present invention.

EXAMPLES

Next, specific Examples of the present invention are described but the present invention is not particularly limited to Examples.

Example 1

A 25 μm thick biaxially stretched polyamide film 2 having a fracture strength/fracture strain value of 350 MPa and a fracture strain of 0.8 was dry-laminated on one surface of a 40 μm thick aluminum foil 4, and then a 40 μm thick non-stretched polypropylene film 3 was dry-laminated on the other surface of the aluminum foil 4, thereby obtaining a molding packaging material illustrated in FIG. 1. As an adhesive for the dry lamination, urethane adhesives 5 and 6 were used.

The biaxially stretched polyamide film having a fracture strength/fracture strain value of 350 MPa and a fracture strain of 0.8 is one obtained by subjecting a nylon resin composition obtained by mixing 100 parts by mass of 6-nylon and 0.2 part by mass of an antiblocking agent (silica particles of an average particle diameter of 2 μm) to stretching processing using a simultaneous biaxial stretching method, and then setting the heat setting temperature in the stretching processing to 190° C.

The non-stretched polypropylene film is one obtained by subjecting a polypropylene resin composition obtained by mixing 100 parts by mass of polypropylene resin, 0.1 part by mass of an antiblocking agent (silica particles of an average particle diameter of 2 μm), and 0.1 part by mass of erucamide to non-stretching T-die film formation processing.

The A/B value of the friction coefficient ratio of the biaxially stretched polyamide film in the molding packaging Material obtained by laminating as described above was 1.0. The C/D value of the friction coefficient ratio of the non-stretched polypropylene film in the molding packaging material was 1.1.

Example 2

A molding packaging material was obtained in the same manner as in Example 1, except using a biaxially stretched polyamide film having a fracture strength/fracture strain value of 240 MPa and a fracture strain of 1.0 in place of the biaxially stretched polyamide film having a fracture strength/fracture strain value of 350 MPa and a fracture strain of 0.8.

The biaxially stretched polyamide film having a fracture strength/fracture strain value of 240 MPa and a fracture strain of 1.0 is one obtained by subjecting the same nylon resin composition as that of Example 1 to stretching processing using a simultaneous biaxial stretching method, and then setting the heat setting temperature in the stretching processing to 200° C.

The A/B value of the friction coefficient ratio of the biaxially stretched polyamide film in the molding packaging material obtained by laminating as described above was 1.1. The C/D value of the friction coefficient ratio of the non-stretched polypropylene film in the molding packaging material was 1.1.

Example 3

A molding packaging material was obtained in the same manner as in Example 1, except using a biaxially stretched polyamide film having a fracture strength/fracture strain value of 270 MPa and a fracture strain of 1.2 in place of the biaxially stretched polyamide film having a fracture strength/fracture strain value of 350 MPa and a fracture strain of 0.8 and using a polypropylene resin composition obtained by mixing 100 parts by mass of polypropylene resin and 0.1 part by mass of an antiblocking agent (silica particles of an average particle diameter of 2 μm) as the polypropylene resin composition.

The biaxially stretched polyamide film having a fracture strength/fracture strain value of 270 MPa and a fracture strain of 1.2 is one obtained by subjecting the same nylon resin composition as that of Example 1 to stretching processing using a simultaneous biaxial stretching method, and then setting the heat setting temperature in the stretching processing to 195° C.

The A/B value of the friction coefficient ratio of the biaxially stretched polyamide film in the molding packaging material obtained by laminating as described above was 1.4. The C/D value of the friction coefficient ratio of the non-stretched polypropylene film in the molding packaging material was 1.3.

Example 4

A molding packaging material was obtained in the same manner as in Example 1, except using a biaxially stretched polyamide film having a fracture strength/fracture strain value of 320 MPa and a fracture strain of 2.0 in place of the biaxially stretched polyamide film having a fracture strength/fracture strain value of 350 MPa and a fracture strain of 0.8.

The biaxially stretched polyamide film having a fracture strength/fracture strain value of 320 MPa and a fracture strain of 2.0 is one obtained by subjecting the same nylon resin composition as that of Example 1 to stretching processing using a simultaneous biaxial stretching method, and then setting the heat setting temperature in the stretching processing to 190° C.

The A/B value of the friction coefficient ratio of the biaxially stretched polyamide film in the molding packaging material obtained by laminating as described above was 1.0. The C/D value of the friction coefficient ratio of the non-stretched polypropylene film in the molding packaging material was 1.1.

Example 5

A molding packaging material was obtained in the same manner as in Example 1, except using a biaxially stretched polyamide film having a fracture strength/fracture strain value of 300 MPa and a fracture strain of 1.0 in place of the biaxially stretched polyamide film having a fracture strength/fracture strain value of 350 MPa and a fracture strain of 0.8.

The biaxially stretched polyamide film having a fracture strength/fracture strain value of 300 MPa and a fracture strain of 1.0 is one obtained by subjecting the same nylon resin composition as that of Example 1 to stretching processing using a simultaneous biaxial stretching method, and then setting the heat setting temperature in the stretching processing to 195° C.

The A/B value of the friction coefficient ratio of the biaxially stretched polyamide film in the molding packaging material obtained by laminating as described above was 1.0. The C/D value of the friction coefficient ratio of the non-stretched polypropylene film in the molding packaging material was 1.1.

Example 6

A molding packaging material was obtained in the same manner as in Example 3, except using a biaxially stretched polyamide film having a fracture strength/fracture strain value of 300 MPa and a fracture strain of 0.4 in place of the biaxially stretched polyamide film having a fracture strength/fracture strain value of 270 MPa and a fracture strain of 1.2.

The biaxially stretched polyamide film having a fracture strength/fracture strain value of 300 MPa and a fracture strain of 0.4 is one obtained by subjecting the same nylon resin composition as that of Example 1 to stretching processing using a simultaneous biaxial stretching method, and then setting the heat setting temperature in the stretching processing to 190° C.

The A/B value of the friction coefficient ratio of the biaxially stretched polyamide film in the molding packaging material obtained by laminating as described above was 1.4. The C/D value of the friction coefficient ratio of the non-stretched polypropylene film in the molding packaging material was 1.4.

Example 7

A molding packaging material was obtained in the same manner as in Example 5, except using a nylon resin composition obtained by mixing 100 parts by mass of 6-nylon and 0.2 part by mass of an antiblocking agent (acryl resin beads) as a nylon resin composition and using a polypropylene resin composition obtained by mixing 100 parts by mass of polypropylene resin, 0.1 part by mass of an antiblocking agent (silica particles of an average particle diameter of 2 μm), and 0.2 part by mass of erucamide as a polypropylene resin composition.

The A/B value of the friction coefficient ratio of the biaxially stretched polyamide film in the molding packaging material obtained by laminating was 1.1. The C/D value of the friction coefficient ratio of the non-stretched polypropylene film in the molding packaging material was 1.1.

Example 8

A molding packaging material was obtained in the same manner as in Example 5, except using a polypropylene resin composition obtained by mixing 100 parts by mass of polypropylene resin, 0.2 part by mass of an antiblocking agent (silica particles of an average particle diameter of 2 μm), and 0.1 part by mass of erucamide as a polypropylene resin composition.

The A/B value of the friction coefficient ratio of the biaxially stretched polyamide film in the molding packaging material obtained by laminating was 1.0. The C/D value of the friction coefficient ratio of the non-stretched polypropylene film in the molding packaging material was 1.1.

Example 9

A molding packaging material was obtained in the same manner as in Example 5, except using a polypropylene resin composition obtained by mixing 100 parts by mass of polypropylene resin and 0.15 part by mass of an antiblocking agent (silica particles of an average particle diameter of 3 μm) as a polypropylene resin composition.

The A/B value of the friction coefficient ratio of the biaxially stretched polyamide film in the molding packaging material obtained by laminating was 1.5. The C/D value of the friction coefficient ratio of the non-stretched polypropylene film in the molding packaging material was 1.3.

Example 10

A molding packaging material was obtained in the same manner as in Example 5, except using a nylon resin composition obtained by mixing 100 parts by mass of 6-nylon and 0.3 part by mass of an antiblocking agent (acryl resin beads of an average particle diameter of 2 μm) as a nylon resin composition and using a polypropylene resin composition obtained by mixing 100 parts by mass of polypropylene resin and 0.10 part by mass of an antiblocking agent (silica particles of an average particle diameter of 2 μm) as a polypropylene resin composition.

The A/B value of the friction coefficient ratio of the biaxially stretched polyamide film in the molding packaging material obtained by laminating was 1.6. The C/D value of the friction coefficient ratio of the non-stretched polypropylene film in the molding packaging material was 1.1.

Example 11

A molding packaging material was obtained in the same manner as in Example 5, except using a nylon resin composition obtained by mixing 100 parts by mass of 6-nylon and 0.25 part by mass of an antiblocking agent (silica particles of an average particle diameter of 2 μm) as a nylon resin composition and using a polypropylene resin composition obtained by mixing 100 parts by mass of polypropylene resin and 0.10 part by mass of an antiblocking agent (silica particles of an average particle diameter of 2 μm) as a polypropylene resin composition.

The A/B value of the friction coefficient ratio of the biaxially stretched polyamide film in the molding packaging material obtained by laminating was 1.4. The C/D value of the friction coefficient ratio of the non-stretched polypropylene film in the molding packaging material was 1.3.

Example 12

A molding packaging material was obtained in the same manner as in Example 5, except using a nylon resin composition obtained by mixing 100 parts by mass of 6-nylon and 0.05 part by mass of an antiblocking agent (silica particles of an average particle diameter of 2 μm) as a nylon resin composition and using a polypropylene resin composition obtained by mixing 100 parts by mass of polypropylene resin and 0.05 part by mass of an antiblocking agent (silica particles of an average particle diameter of 2 μm) as a polypropylene resin composition.

The A/B value of the friction coefficient ratio of the biaxially stretched polyamide film in the molding packaging material obtained by laminating was 2.2. The C/D value of the friction coefficient ratio of the non-stretched polypropylene film in the molding packaging material was 1.6.

Example 13

A molding packaging material was obtained in the same manner as in Example 5, except using a polypropylene resin composition obtained by mixing 100 parts by mass of polypropylene resin and 0.01 part by mass of an antiblocking agent (silica particles of an average particle diameter of 2 μm) as a polypropylene resin composition.

The A/B value of the friction coefficient ratio of the biaxially stretched polyamide film in the molding packaging material obtained by laminating was 1.4. The C/D value of the friction coefficient ratio of the non-stretched polypropylene film in the molding packaging material was 2.2.

Comparative Example 1

A molding packaging material was obtained in the same manner as in Example 1, except using a biaxially stretched polyamide film having a fracture strength/fracture strain value of 370 MPa and a fracture strain of 0.8 in place of the biaxially stretched polyamide film having a fracture strength/fracture strain value of 350 MPa and a fracture strain of 0.8.

The biaxially stretched polyamide film having a fracture strength/fracture strain value of 370 MPa and a fracture strain of 0.8 is one obtained by subjecting the same nylon resin composition as that of Example 1 to stretching processing using a simultaneous biaxial stretching method, and then setting the heat setting temperature in the stretching processing to 180° C.

The A/B value of the friction coefficient ratio of the biaxially stretched polyamide film in the molding packaging material obtained by laminating was 1.0. The C/D value of the friction coefficient ratio of the non-stretched polypropylene film in the molding packaging material was 1.1.

Comparative Example 2

A molding packaging material was obtained in the same manner as in Example 1, except using a biaxially stretched polyamide film having a fracture strength/fracture strain value of 220 MPa and a fracture strain of 1.0 in place of the biaxially stretched polyamide film having a fracture strength/fracture strain value of 350 MPa and a fracture strain of 0.8.

The biaxially stretched polyamide film having a fracture strength/fracture strain value of 220 MPa and a fracture strain of 1.0 is one obtained by subjecting the same nylon resin composition as that of Example 1 to stretching processing using a simultaneous biaxial stretching method, and then setting the heat setting temperature in the stretching processing to 220° C.

The A/B value of the friction coefficient ratio of the biaxially stretched polyamide film in the molding packaging material obtained by laminating as described above was 1.5. The C/D value of the friction coefficient ratio of the non-stretched polypropylene film in the molding packaging material was 1.3.

TABLE 1

| | Biaxially stretched polyamide film | | Each friction coefficient, | | | | | | |
| --- | --- | --- | --- | --- | --- | --- | --- | --- | --- |
| | Fracture strength/ Fracture strain (MPa) | Fracture strain | Friction coefficient ratio (static/dynamic) | | | | | | Occurrence of separation |
| | | | A | B | A/B | C | D | C/D | Moldability | |
| Example 1 | 350 | 0.8 | 0.23 | 0.23 | 1.0 | 0.13 | 0.12 | 1.1 | ⊚ | Not-occurred |
| Example 2 | 240 | 1.0 | 0.20 | 0.19 | 1.1 | 0.15 | 0.14 | 1.1 | ⊚ | Not-occurred |
| Example 3 | 270 | 1.2 | 0.35 | 0.25 | 1.4 | 0.40 | 0.30 | 1.3 | ○ | Not-occurred |
| Example 4 | 320 | 2.0 | 0.24 | 0.23 | 1.0 | 0.20 | 0.19 | 1.1 | ⊚ | Not-occurred |
| Example 5 | 300 | 1.0 | 0.22 | 0.21 | 1.0 | 0.21 | 0.20 | 1.1 | ⊚ | Not-occurred |
| Example 6 | 300 | 0.4 | 0.33 | 0.24 | 1.4 | 0.41 | 0.30 | 1.4 | ○ | Not-occurred |
| Example 7 | 300 | 1.0 | 0.19 | 0.18 | 1.1 | 0.13 | 0.12 | 1.1 | ⊚ | Not-occurred |
| Example 8 | 300 | 1.0 | 0.23 | 0.22 | 1.0 | 0.29 | 0.27 | 1.1 | ⊚ | Not-occurred |
| Example 9 | 300 | 1.0 | 0.35 | 0.24 | 1.5 | 0.32 | 0.25 | 1.3 | ○ | Not-occurred |
| Example 10 | 300 | 1.0 | 0.34 | 0.21 | 1.6 | 0.15 | 0.14 | 1.1 | ○ | Not-occurred |
| Example 11 | 300 | 1.0 | 0.33 | 0.24 | 1.4 | 0.35 | 0.26 | 1.3 | ○ | Not-occurred |
| Example 12 | 300 | 1.0 | 0.61 | 0.28 | 2.2 | 0.47 | 0.30 | 1.6 | Δ | Not-occurred |
| Example 13 | 300 | 1.0 | 0.33 | 0.24 | 1.4 | 0.89 | 0.41 | 2.2 | Δ | Not-occurred |
| Comparative Example 1 | 370 | 0.8 | 0.24 | 0.23 | 1.0 | 0.15 | 0.14 | 1.1 | ○ | Occurred |
| Comparative Example 2 | 220 | 1.0 | 0.35 | 0.24 | 1.5 | 0.38 | 0.29 | 1.3 | X | Not-occurred |

A: Coefficient of static friction between outer surfaces of biaxially stretched nylon film layer
B: Coefficient of dynamic friction between outer surfaces of biaxially stretched nylon film layer
C: Coefficient of static friction between outer surfaces of non-stretched polypropylene layer
D: Coefficient of dynamic friction between outer surfaces of non-stretched polypropylene layer Each molding packaging material obtained as described above was subjected to performance evaluation based on the following evaluation methods.

<Moldability Evaluation Method>

The molding packaging material was subjected to deep draw forming into a rectangular parallelepiped shape of 55 mm length×35 mm width×8 mm depth using a deep draw forming tool manufactured by Amada Co., Ltd. Then, the moldability in the four corner portions of the obtained molded case was evaluated based on the following judgment criteria. The presence of pinholes was investigated by a light transmission method in a darkroom.

(Judgment Criteria)

"x" Pinholes were generated almost the entire surface of the corner portions.

"Δ" The molded shape is sharp and pinholes were rarely generated in a very small part of the corner portions but the generation of pinhoholes substantially hardly occurred.

"○" The molded shape is sharper and pinholes were not generated at all.

"⊚" The molded shape is very sharp and pinholes were not generated at all.

<Evaluation of Occurrence of Separation of Outer Surface>

The molded article obtained by the deep draw forming above was allowed to stand at 80° C. for 3 hours in a dryer, and then the occurrence of the separation of the outer layer was visually observed.

As is clear from Table 1, the molding packaging materials of Examples 1 to 13 of the present invention did not cause the generation of pinholes and the like, can achieve molding of a shape with sharpness and high molding height to have excellent moldability, and did not cause separation of the outer layer.

On the other hand, in Comparative Example 1 in which the fracture strength/fracture strain value of the biaxially stretched polyamide film of the outer layer exceeded 360 MPa, the separation of the outer layer occurred. In Comparative Example 2 in which the fracture strength/fracture strain value of the biaxially stretched polyamide film of the outer layer was less than 230 MPa, the moldability was insufficient.

In the molding packaging material of Examples 3, 6, 9, 10, and 11 in which at least either one of the A/B value and the C/D value was in the range of more than 1.2 and 2.0 or less, the moldability evaluation results is "○" while, in the molding packaging materials of Examples 1, 2, 4, 5, 7, and 8 in which the A/B value is in the range of 1.0 to 1.2, and the C/D value is in the range of 1.0 to 1.2, the moldability evaluation results is "⊚" and the moldability is very excellent.

INDUSTRIAL APPLICABILITY

The molding packaging material of the present invention is suitably used as cases of batteries such as lithium ion secondary batteries for notebook personal computers and cellular phones, in-car secondary batteries, and fixed type secondary batteries and, in addition thereto, suitably used as packaging materials of foods and packaging materials of pharmaceuticals. However, the invention is not particularly limited to the use. Among the above, the invention is particularly preferably used as a battery case.

This application claims priority to Japanese Patent Application No. 2013-42686 filed on Mar. 5, 2013, the disclosure of which including the specification, the drawings, and the claims is hereby incorporated by reference in its entirety.

Technical terms and descriptions used herein are used for describing the embodiments according to the invention and the invention is not limited thereto. Within the range of the invention specified in claims, any design change is permitted insofar as the design change does not deviate from the spirit of the invention.

DESCRIPTION OF THE REFERENCE NUMERALS

1 Molding packaging material
2 Outer layer (biaxially stretched polyamide film layer)
2a Outer surface of outer layer (non-lamination surface)
3 Inner layer (thermoplastic resin layer)
3a Outer surface of inner layer (non-lamination surface)
4 Metal foil layer
5 First adhesive layer
6 Second adhesive layer

The invention claimed is:

1. A molding packaging material, comprising:
   a biaxially stretched polyamide film layer as an outer layer;
   a thermoplastic resin layer as an inner layer; and
   a metal foil layer disposed between the both layers, wherein
   as the biaxially stretched polyamide film, a biaxially stretched polyamide film in which when a fracture strength of the film is defined as "X" and a fracture strain of the film is defined as "Y", a X/Y value is 230 MPa to 360 MPa is used,
   when a coefficient of static friction between outer surfaces of the biaxially stretched polyamide film layer is defined as "A" and a coefficient of dynamic friction between the outer surfaces of the biaxially stretched polyamide film layer is defined as "B", a A/B value is in the range of 1.0 to 2.0, and
   when a coefficient of static friction between outer surfaces of the thermoplastic resin layer is defined as "C" and a coefficient of dynamic friction between the outer surfaces of the thermoplastic resin layer is defined as "D", a C/D value is in the range of 1.0 to 2.0.

2. The molding packaging material according to claim 1, wherein
   the fracture strain of the biaxially stretched polyamide film is 0.5 or more.

3. The molding packaging material according to claim 1, wherein
   the metal foil layer is one in which a chemical conversion coating is formed on both surfaces of the metal foil.

4. The molding packaging material according to claim 1, wherein
   the biaxially stretched polyamide film layer is laminated on one surface of the metal foil layer through a urethane adhesive layer and the thermoplastic resin layer is laminated on the other surface of the metal foil layer through a urethane adhesive layer,
   the metal foil layer is an aluminum foil layer and the thermoplastic resin layer is a non-stretched polypropylene film layer, and
   the biaxially stretched polyamide film is a simultaneously biaxially stretched 6-nylon film.

5. The molding packaging material according to claim 1, wherein
   the biaxially stretched polyamide film layer is laminated on one surface of the metal foil layer through a urethane adhesive layer and the thermoplastic resin layer is laminated on the other surface of the metal foil layer through a urethane adhesive layer,
   the metal foil layer is an aluminum foil layer and the thermoplastic resin layer is a non-stretched polypropylene film layer, and
   the biaxially stretched polyamide film is a simultaneously biaxially stretched 6,6-nylon film.

6. The molding packaging material according to claim 1, wherein
   the biaxially stretched polyamide film layer is laminated on one surface of the metal foil layer through a urethane adhesive layer and the thermoplastic resin layer is laminated on the other surface of the metal foil layer through a urethane adhesive layer,
   the metal foil layer is an aluminum foil layer and the thermoplastic resin layer is a non-stretched polypropylene film layer, and
   the biaxially stretched polyamide film is a simultaneously biaxially stretched MXD nylon film.

7. The molding packaging material according to claim 1, wherein
   the biaxially stretched polyamide film layer is laminated on one surface of the metal foil layer through a urethane adhesive layer and the thermoplastic resin layer is laminated on the other surface of the metal foil layer through a urethane adhesive layer, the metal foil layer is an aluminum foil layer and the thermoplastic resin layer is a non-stretched polypropylene film layer, and the biaxially stretched polyamide film is a successively biaxially stretched 6-nylon film.

8. The molding packaging material according to claim 1, wherein the biaxially stretched polyamide film layer is laminated on one surface of the metal foil layer through a urethane adhesive layer and the thermoplastic resin layer is laminated on the other surface of the metal foil layer through a urethane adhesive layer, the metal foil layer is an aluminum foil layer and the thermoplastic resin layer is a non-stretched polypropylene film layer, and the biaxially stretched polyamide film is a successively biaxially stretched 6,6-nylon film.

9. The molding packaging material according to claim 1, wherein the biaxially stretched polyamide film layer is laminated on one surface of the metal foil layer through a urethane adhesive layer and the thermoplastic resin layer is laminated on the other surface of the metal foil layer through a urethane adhesive layer, the metal foil layer is an aluminum foil layer and the thermoplastic resin layer is a non-stretched polypropylene film layer, and the biaxially stretched polyamide film is a successively biaxially stretched MXD-nylon film.

10. The molding packaging material according to claim 1, wherein the biaxially stretched polyamide film layer contains silica particles.

11. The molding packaging material according to claim 1, wherein the biaxially stretched polyamide film layer contains fatty acid amide.

12. A molded case, which is obtained by subjecting the molding packaging material according to claim 1 to deep draw forming or bulging.

13. The molded case according to claim 12, which is used as a battery case.

* * * * *